US010239561B2

United States Patent
Kindaichi et al.

(10) Patent No.: US 10,239,561 B2
(45) Date of Patent: Mar. 26, 2019

(54) SIDE COLLISION LOAD TRANSMISSION STRUCTURE

(71) Applicant: Toyota Jidosha Kabushiki Kaisha, Toyota-shi (JP)

(72) Inventors: Tetsumasa Kindaichi, Nagoya (JP); Kanichi Saito, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 226 days.

(21) Appl. No.: 15/076,781

(22) Filed: Mar. 22, 2016

(65) Prior Publication Data

US 2016/0288838 A1    Oct. 6, 2016

(30) Foreign Application Priority Data

Apr. 2, 2015   (JP) ................................ 2015-076220

(51) Int. Cl.
  *B62D 21/15*  (2006.01)
  *B60N 2/42*   (2006.01)
  *B60R 21/207* (2006.01)

(52) U.S. Cl.
  CPC ......... *B62D 21/157* (2013.01); *B60N 2/4235* (2013.01); *B60R 21/207* (2013.01)

(58) Field of Classification Search
  CPC .......................... B62D 21/157; B60N 2/4235
  USPC .................................................. 296/187.12
  See application file for complete search history.

(56) References Cited

U.S. PATENT DOCUMENTS

| 5,584,525 | A  | * | 12/1996 | Nakano ................ | B60N 2/4235 |
| | | | | | 296/187.12 |
| 6,299,238 | B1 | * | 10/2001 | Takagi ................. | B60N 2/4235 |
| | | | | | 296/187.12 |
| 6,299,239 | B1 | * | 10/2001 | Sagawa ............... | B60N 2/4235 |
| | | | | | 296/187.12 |
| 9,340,135 | B2 | * | 5/2016  | Sakkinen ............. | B60N 2/4235 |

(Continued)

FOREIGN PATENT DOCUMENTS

| JP | 58-110558 U | 7/1983 |
| JP | 2001-105947 | 4/2001 |

(Continued)

OTHER PUBLICATIONS

Office Action dated May 9, 2017 in Japanese Patent Application No. 2015-076220 (with English language translation).

*Primary Examiner* — Joseph D. Pape
(74) *Attorney, Agent, or Firm* — Oblon, McClelland, Maier & Neustadt, L.L.P.

(57) ABSTRACT

A side collision load transmission structure including a floor tunnel, a vehicle compartment side wall, a vehicle seat, side frames, a first transmission member that couples together lower end portions of the pair of side frames along the vehicle width direction, a load receiving member, and a second transmission member that couples together a portion further to a seatback up-down direction upper side than a join portion with the first transmission member on the side frame, out of the pair of side frames, on the vehicle compartment side wall side and a portion of the first transmission member that is further to a vehicle width direction outside than the length direction center of the first transmission member so as to be coupled at an incline as viewed from the front of the vehicle.

3 Claims, 8 Drawing Sheets

(56) References Cited

U.S. PATENT DOCUMENTS

| | | | | |
|---|---|---|---|---|
| 2010/0007174 A1* | 1/2010 | Yamaki | ................ | B60N 2/4235 296/187.12 |
| 2010/0295335 A1* | 11/2010 | DeVor | .................. | B60N 2/4235 296/187.12 |
| 2011/0298267 A1 | 12/2011 | Yamaki et al. | | |
| 2015/0108788 A1* | 4/2015 | Ikeda | .................. | B62D 21/157 296/187.12 |

FOREIGN PATENT DOCUMENTS

| | | |
|---|---|---|
| JP | 2001-149175 A | 6/2001 |
| JP | 2005-67427 | 3/2005 |
| JP | 2009-6895 | 1/2009 |
| JP | 2009-96216 | 5/2009 |
| JP | 2010-280329 | 12/2010 |
| JP | 2011-255698 A | 12/2011 |

\* cited by examiner

SIDE COLLISION LOAD TRANSMISSION STRUCTURE

CROSS-REFERENCE TO RELATED APPLICATION

This application is based on and claims priority under 35 USC 119 from Japanese Patent Application No. 2015-076220 filed on Apr. 2, 2015, the disclosure of which is incorporated by reference herein.

BACKGROUND

Technical Field

The present invention relates to a side collision load transmission structure.

Related Art

Japanese Patent Application Laid-Open (JP-A) Nos. 2010-280329 and 2009-006895 describe structures in which a seat reinforcement member is provided to reinforce the strength of a seat with respect to collision load in a side-on collision (referred to below simply as "side collision"). The seat reinforcement member is provided at an incline as viewed from the front of the vehicle such that a vehicle width direction outside end portion of the reinforcement member faces the vicinity of a door armrest and a vehicle width direction inside end portion of the reinforcement member faces a side face of a console box. Accordingly, collision load from the vehicle width direction outside is efficiently transmitted to the console box, and space inside the vehicle compartment is secured.

JP-A No. 2005-067427 describes a structure in which a substantially L-shaped seat reinforcement member is provided at a vehicle front side of a seatback frame that is a seatback frame member.

In order to reduce the load imparted to the neck of an occupant in a rear-end collision (referred to below simply as "rear collision"), seats sometimes employ a neck load reduction structure that makes it easier for the upper body of the occupant to sink into a seatback, in order to suppress the head of an occupant from tilting back on its own.

However, the related art described above does not consider a relationship with a neck load reduction structure, and in the structures in JP-A Nos. 2010-280329 and 2009-006895 in particular, it is conceivable that the reinforcement members could obstruct the upper body from sinking into the seatback, affecting neck load reduction performance. The structure in JP-A No. 2005-067427 leaves room for improvement with regard to making the seat thinner (reducing the thickness of the seatback).

SUMMARY

In consideration of the above circumstances, an object of the present invention is to obtain a side collision load transmission structure capable of reducing an intrusion amount of a side wall of a vehicle compartment (a center pillar, side door, or the like) in a side collision, without increasing the thickness of a seatback, and while maintaining good neck load reduction performance.

A side collision load transmission structure of a first aspect of the present invention includes: a floor tunnel that is provided at a vehicle width direction central portion of a vehicle body floor, and that extends along a vehicle front-rear direction; a vehicle compartment side wall that configures a side wall of a vehicle compartment; a vehicle seat that is provided between the floor tunnel and the vehicle compartment side wall, and that includes a neck load reduction structure to allow the upper body of an occupant to sink into a seatback in a rear-end collision; a pair of side frames that are disposed at a separation to each other in a seatback width direction and configure left and right frames of the seatback, and that are each configured including a general portion forming a face orthogonal to the seatback width direction; a first transmission member that is disposed with its length direction along the seatback width direction and that couples together lower end portions of the pair of side frames along the vehicle width direction, that is provided so as to avoid a range where the upper body of the occupant sinks into the seatback in a rear-end collision, and that is hidden by the general portions of the pair of side frames as viewed from a side of the vehicle; a load receiving member that is disposed at a vehicle upper side of the floor tunnel, and that is provided so as to face a vehicle width direction inside end portion of the first transmission member in the vehicle width direction; and a second transmission member that couples together a portion further to a seatback up-down direction upper side than a join portion with the first transmission member on the side frame, out of the pair of side frames, on the vehicle compartment side wall side and a portion of the first transmission member that is further to a vehicle width direction outside than the length direction center of the first transmission member so as to be coupled at an incline as viewed from the front of the vehicle, is provided so as to avoid the range where the upper body of the occupant sinks into the seatback in a rear-end collision, and is hidden by the general portions of the pair of side frames as viewed from the side of the vehicle.

The side collision load transmission structure of the first aspect of the present invention includes the pair of side frames configuring left and right frames of the seatback, and the first transmission member couples together the lower end portions of the pair of side frames along the vehicle width direction. The load receiving member is provided so as to face the vehicle width direction inside end portion of the first transmission member in the vehicle width direction. Accordingly, in a side collision, when load in the vehicle width direction is input to the seatback from the vehicle compartment side wall, for example a pillar or a side door, load input to a lower section of the seatback is transmitted through the first transmission member to the load receiving member, and is further transmitted through the floor, tunnel to the vehicle body floor.

The side collision load transmission structure further includes the second transmission member. The second transmission member couples together a portion of the side frame, out of the pair of side frames, on the vehicle compartment side wall side that is further to the seatback up-down direction upper side than a portion joined to the first transmission member, and a portion of the first transmission member that is further to the vehicle width direction outside than the length direction center of the first transmission member, so as to be coupled at an incline as viewed from the front of the vehicle. Accordingly, in the event of a side collision, load input to an up-down direction intermediate portion of the seatback is transmitted through the second transmission member and the first transmission member to the load receiving member, and is further transmitted through the floor tunnel to the vehicle body floor.

As described above, in the side collision load transmission structure, vehicle width direction load input to the seatback in a side collision is transmitted to the load receiving member along two routes. This thereby enables deformation of the seatback to be suppressed, and also enables a reduction in an intrusion amount of the vehicle compartment side wall over a region from the chest region to the waist region of the occupant.

Moreover, the first transmission member and the second transmission member are provided avoiding the range where the upper body of the occupant sinks into the seatback in a rear-end collision. Accordingly, the upper body of the occupant is not impeded from sinking into the seatback, and the neck load reduction performance of the vehicle seat is not affected.

The first transmission member and the second transmission member are both hidden by the general portions of the pair of side frames as viewed from the side of the vehicle. An increase in the thickness of the seatback due to the first transmission member and the second transmission member is accordingly suppressed.

A side collision load transmission structure of a second aspect of the present invention is the first aspect, wherein the second transmission member includes: a front plate portion that extends along the width direction and the up-down direction of the seatback; a rear plate portion that is disposed at a separation to a seatback front-rear direction rear side of the front plate portion, and that extends along the width direction and the up-down direction of the seatback; and a coupling plate portion that couples the front plate portion and the rear plate portion together in the seatback front-rear direction.

In the side collision load transmission structure of the second aspect of the present invention, the second transmission member is configured including the front plate portion, the rear plate portion, and the coupling plate portion, such that the cross-section profile of the second transmission member enables strength to be secured easily. This thereby enables deformation of the seatback to be further suppressed, and enables a reduction in the intrusion amount of the vehicle compartment side wall aver the region from the chest region to the waist region of the occupant.

A side collision load transmission structure of a third aspect of the present invention is the second aspect, wherein the coupling plate portion couples together seatback width direction outside end portions of the front plate portion and the rear plate portion.

In the side collision load transmission structure of the third aspect of the present invention, the coupling plate portion couples together the seatback width direction outside end portions of the front plate portion and the rear plate portion. Namely, a cross-section of the second transmission member taken orthogonally to the seatback up-down direction has a substantially U-shape (a shape substantially resembling three sides of a rectangle) opening toward the seatback width direction inside. The second transmission member can accordingly be easily manufactured by pressing sheet metal or the like. Moreover, since the coupling plate portion can be overlapped with the general portion of the side frame, the second transmission member and the side frame can be joined together easily, and the joint strength can be easily secured.

A side collision load transmission structure of a fourth aspect of the present invention is of any one of the first aspect to the third aspect, further including: a side airbag inflator that is fixed by a fastening member to the seatback width direction outside of the side frame, out of the pair of side frames, on the vehicle compartment side wall side; and wherein an upper portion of the second transmission member is joined to the side frame on the vehicle compartment side wall side by the fastening member.

The side collision load transmission structure of the fourth aspect of the present invention includes the side airbag inflator. The inflator is fixed to the seatback width direction outside of the side frame, out of the pair of side frames, on the vehicle compartment side wall side. The upper portion of the second transmission member is fixed to the side frame by the fastening member that fixes the inflator to the side frame. In a side collision, load is accordingly transmitted promptly to the upper portion of the second transmission member through the inflator. Moreover, the same fastening member can be commonly used as both the fastening member that fixes the inflator and the fastening member that joins the second transmission member.

As described above, the first aspect of the present invention exhibits the excellent advantageous effect of enabling a reduction in an intrusion amount of the vehicle compartment side wall in a side collision, without increasing the thickness of the seatback, and while maintaining good neck load reduction performance.

The second aspect of the present invention exhibits the excellent advantageous effect of enabling a further reduction in the intrusion amount of the vehicle compartment side wall in a side collision, in addition to the advantageous effects of the first aspect.

The third aspect of the present invention exhibits the excellent advantageous effect of enabling easy manufacture of the second transmission member, and of enabling the joint strength between the second transmission member and the side frame to be easily secured, in addition to the advantageous effects of the second aspect.

The fourth aspect of the present invention exhibits the excellent advantageous effect of enabling prompt load transmission to the second transmission member, and of enabling a reduction in the number of components, in addition to the advantageous effects of any one of the first aspect to the third aspect.

DETAILED DESCRIPTION

Explanation follows regarding an exemplary embodiment of a side collision load transmission structure according to the present invention, with reference to FIG. 1 to FIG. 8. Note that in the drawings, the arrow FR, the arrow UP, and the arrow OUT respectively indicate a vehicle front direction (direction of travel), an upward direction, and a vehicle width direction outside. In the following explanation, reference simply to the front and rear, left and right, and upward and downward directions refers to the front and rear in a vehicle front-rear direction, the left and right in a vehicle left-right direction (vehicle width direction), and upward and downward in a vehicle up-down direction.

Figure 1:
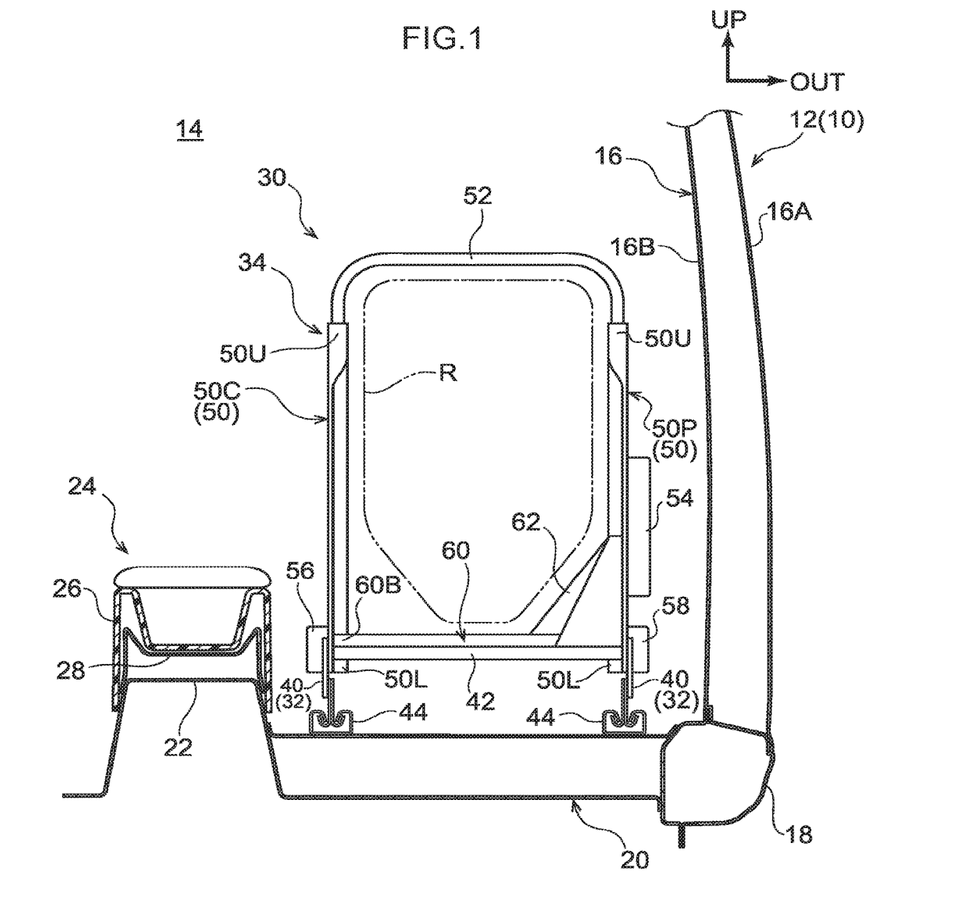
FIG. 1 is a cross-section illustrating a side collision load transmission structure of an exemplary embodiment, as viewed from a vehicle front side.

FIG. 1 illustrates a vehicle 12 applied with a side collision load transmission structure 10 according to the present exemplary embodiment. The vehicle 12 includes a center pillar 16, serving as a vehicle compartment side wall configuring part of a side wall of a vehicle compartment 14, and a front side door (not illustrated in the drawings). The center pillar 16 is a vehicle body framework member extending in the vehicle up-down direction, and is configured including a pillar outer 16A disposed on the vehicle outside, and a pillar inner 16B disposed on the vehicle inside. A lower end of the center pillar 16 is joined to a rocker 18 that extends along the vehicle front-rear direction at a vehicle width direction end portion of a vehicle lower section. A front side door, not illustrated in the drawings, is provided at a front side of the center pillar 16 so as to be capable of opening and closing. Note that an upper end of the center pillar 16 is joined to a roof side rail (not illustrated in the drawings) that extends along the vehicle front-rear direction at a vehicle width direction end portion of a vehicle upper section.

A floor tunnel 22 that projects out upward and extends in the vehicle front-rear direction is provided at a width direction central portion of a floor panel 20 configuring a vehicle body floor. The floor tunnel 22 is formed in a saddle shape opening toward the vehicle lower side. A console box 24, serving as a load receiving member, is provided at a vehicle upper side of the floor tunnel 22. The console box 24 is configured including a console box body 26 made from a synthetic resin, and a reinforcement member 28, made from metal, for example. The console box 24 is reinforced by the reinforcement member 28, such that load input in the vehicle width direction is efficiently transmitted. The console box 24 is provided facing a vehicle width direction inside end portion 60B of a first transmission member 60, described later, in the vehicle width direction.

A vehicle seat (front seat) 30 is provided between the center pillar 16 and the front side door, not illustrated in the drawings, and the floor tunnel 22. The vehicle seat 30 includes a seat cushion frame 32 and a seatback frame 34. The seat cushion frame 32 configures a frame of a seat cushion 36 (see FIG. 8) on which an occupant sits, and the seatback frame 34 configures a frame of a seatback 38 (see FIG. 8), this being a backrest (note that in FIG. 1, only seat cushion side frames 40 configuring left and right side portions of the seat cushion frame 32 are illustrated, and other frames configuring the seat cushion frame 32 are omitted from illustration). A lower end portion of the seatback frame 34 is tiltably supported at a rear end portion of the seat cushion frame 32, and the seatback 38 is capable of reclining about a reclining rod 42 fixed to the seat cushion frame 32. The seat cushion frame 32 is slidably supported on a pair of slide rails 44 fixed to the floor panel 20 of the vehicle compartment 14. The position of the vehicle seat 30 is accordingly adjustable in the front-rear direction. A seat spring, not illustrated in the drawings, and a seat pad 46 (see FIG. 3, FIG. 4, and FIG. 7) are attached to the seat cushion frame 32 and the seatback frame 34, and the surface of the seat pad 46 is covered by a seat cover 48.

The seatback frame 34 includes a pair of left and right seatback side frames (referred to below simply as "side frames") 50 extending in the up-down direction of the seatback 38 at left and right side sections of the seatback 38. Upper end portions 50U of the pair of left and right side frames 50 are coupled together by a seatback upper frame 52 formed substantially in an inverted U-shape. Moreover, lower end portions 50L of the pair of left and right side frames 50 are coupled together by the first transmission member 60. The seatback frame 34 is further provided with a second transmission member 62. The first transmission member 60 and the second transmission member 62 are described in detail later.

In the following explanation, a direction along the length direction of the side frames 50 is referred to as the seatback up-down direction, and the direction in which the pair of left and right side frames 50 face each other is referred to as the seatback width direction. A direction orthogonal to both the up-down direction and the width direction of the seatback is referred to as the seatback front-rear direction, and a seatback front direction refers to the side on which the occupant sits. Out of these directions, the seatback width direction corresponds to the vehicle width direction.

An airbag module 54 configuring a relevant portion of a side airbag device is attached to a vehicle width direction outside face of the side frame 50P on the vehicle width direction outside (the center pillar 16 side) out of the pair of left and right side frames 50. The airbag module 54 is configured in an elongated rectangular box shape, and its length direction is disposed in an orientation running in the up-down direction of the seatback 38.

Respective gap reducing members 56, 58 are provided on an extension line of an axis of the first transmission member 60 at the seatback width direction outsides of the pair of left and right side frames 50. Namely, the gap reducing member 56 on the vehicle width direction inside is disposed between the console box 24 and the first transmission member 60, and the gap reducing member 58 on the vehicle width direction outside is disposed between the center pillar 16 and the first transmission member 60. The gap reducing members 56, 58 efficiently transmit load through the first transmission member 60 to the console box 24 in a side collision.

Figure 8:
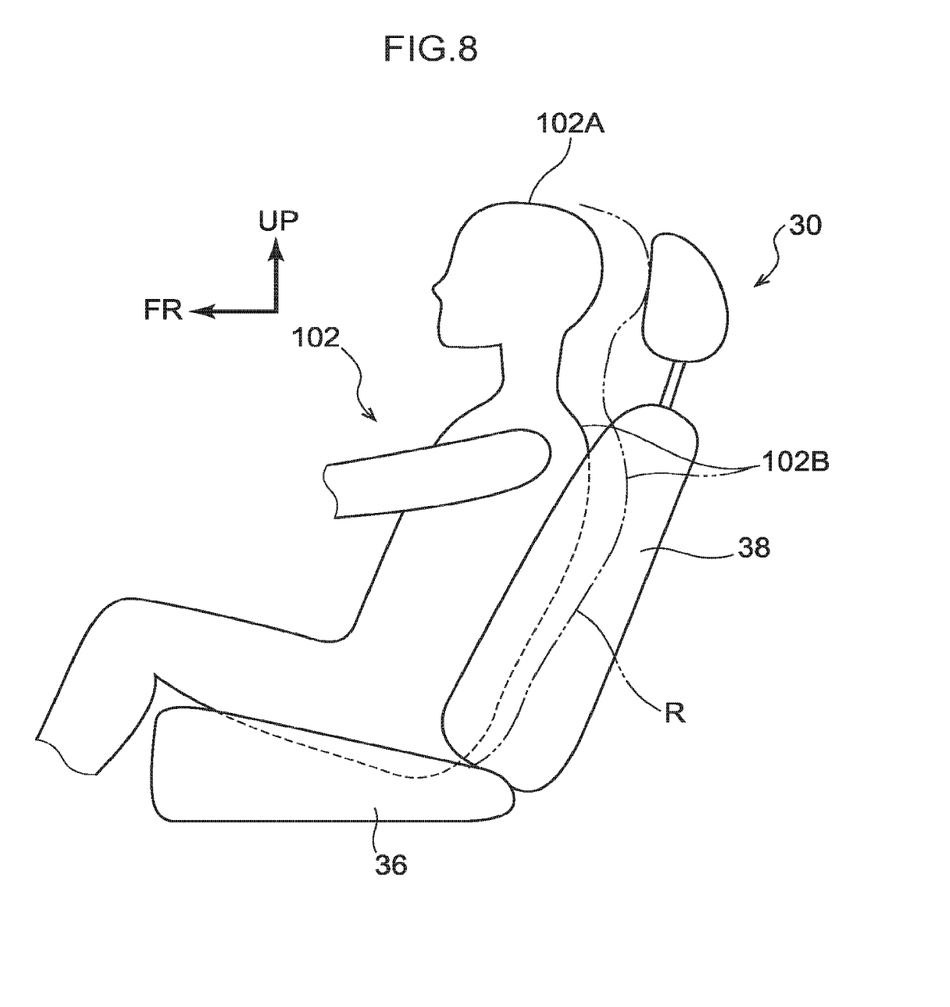
FIG. 8 is a side view schematically illustrating a neck load reduction structure of a vehicle seat.

The vehicle seat 30 is provided with a neck load reduction structure to reduce the load on the neck by allowing the upper body of the occupant to sink into the seatback 38. The neck load reduction structure allows the upper body of the occupant to sink into the seatback 38 in a rear collision by setting the elasticity of the seat spring attached to the seatback frame 34 and the hardness of the seat pad 46 appropriately (see the rear collision sink-in range R illustrated in FIG. 8 and in FIG. 3 and FIG. 4). The back (upper body) 102B of an occupant 102 is allowed to sink into the seatback 38, thereby preventing the back 102B of the occupant 102 from being restrained earlier than the head 102A. As illustrated in FIG. 8, the back 102B and the head 102A of the occupant 102 are thereby restrained at the same time as each other. There is a resulting reduction in rear collision whiplash injury.

Note that the neck load reduction structure employed in the vehicle seat is not limited thereto. For example, allowing the upper body of the occupant to sink into the seatback in a rear collision may be combined with a headrest that moves forward (what is referred to as an active headrest).

Figure 2:
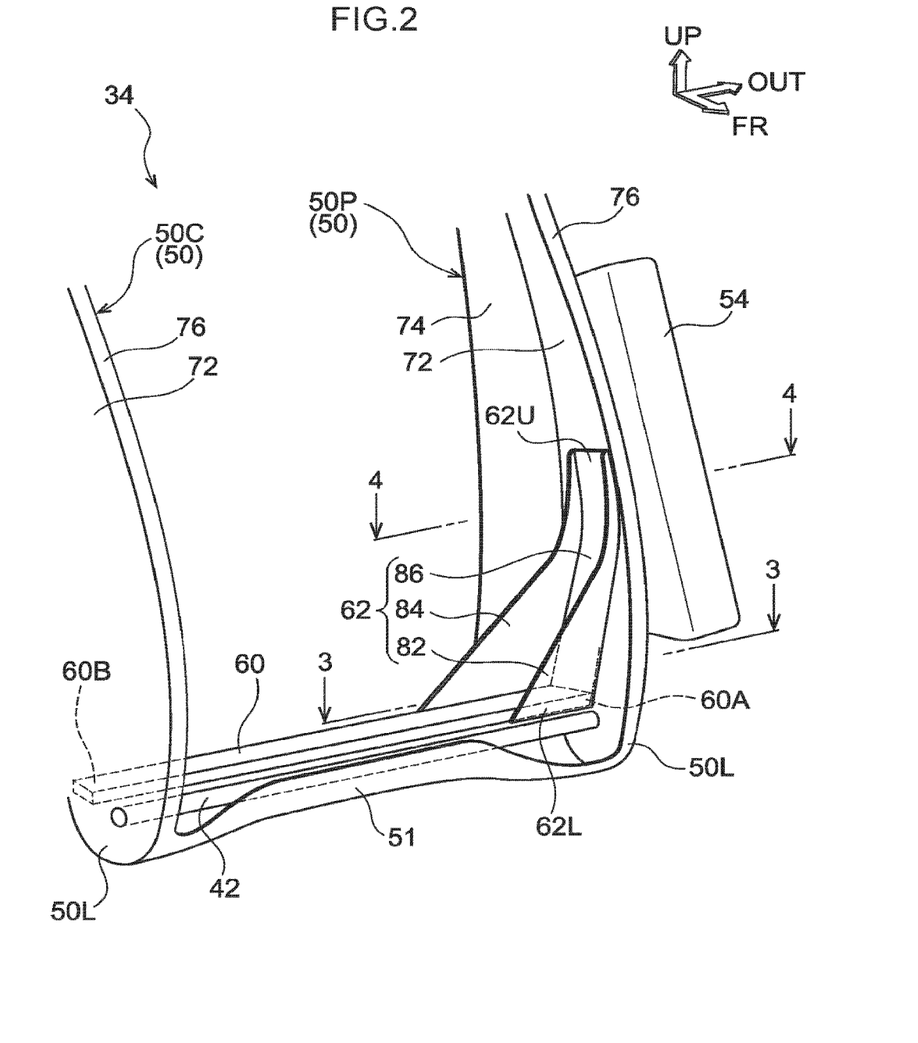
FIG. 2 is an enlarged perspective view illustrating relevant portions of the seatback frame illustrated in FIG. 1.
Figure 3:
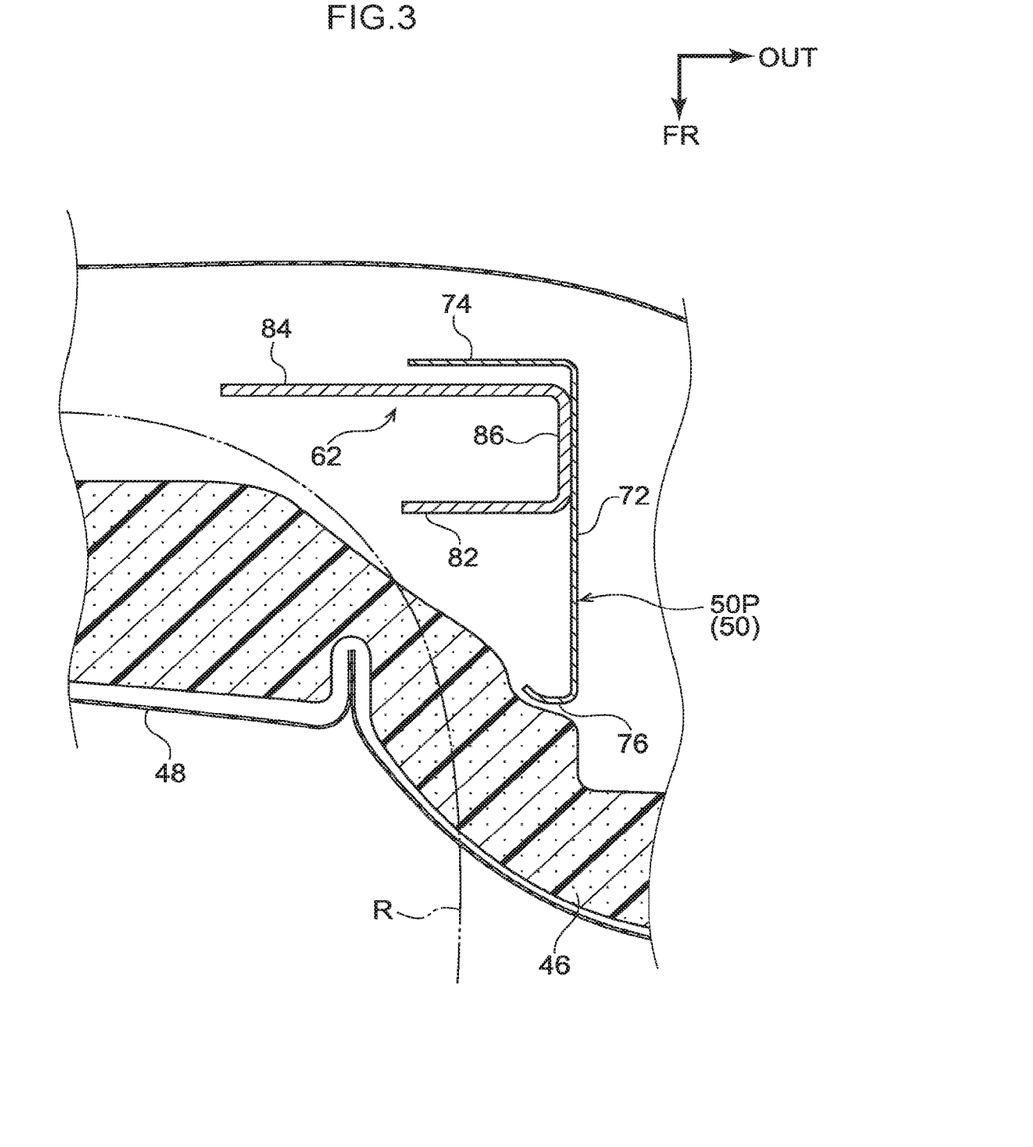
FIG. 3 is a cross-section illustrating an enlarged cross-section taken along line 3-3 in FIG. 2.
Figure 4:
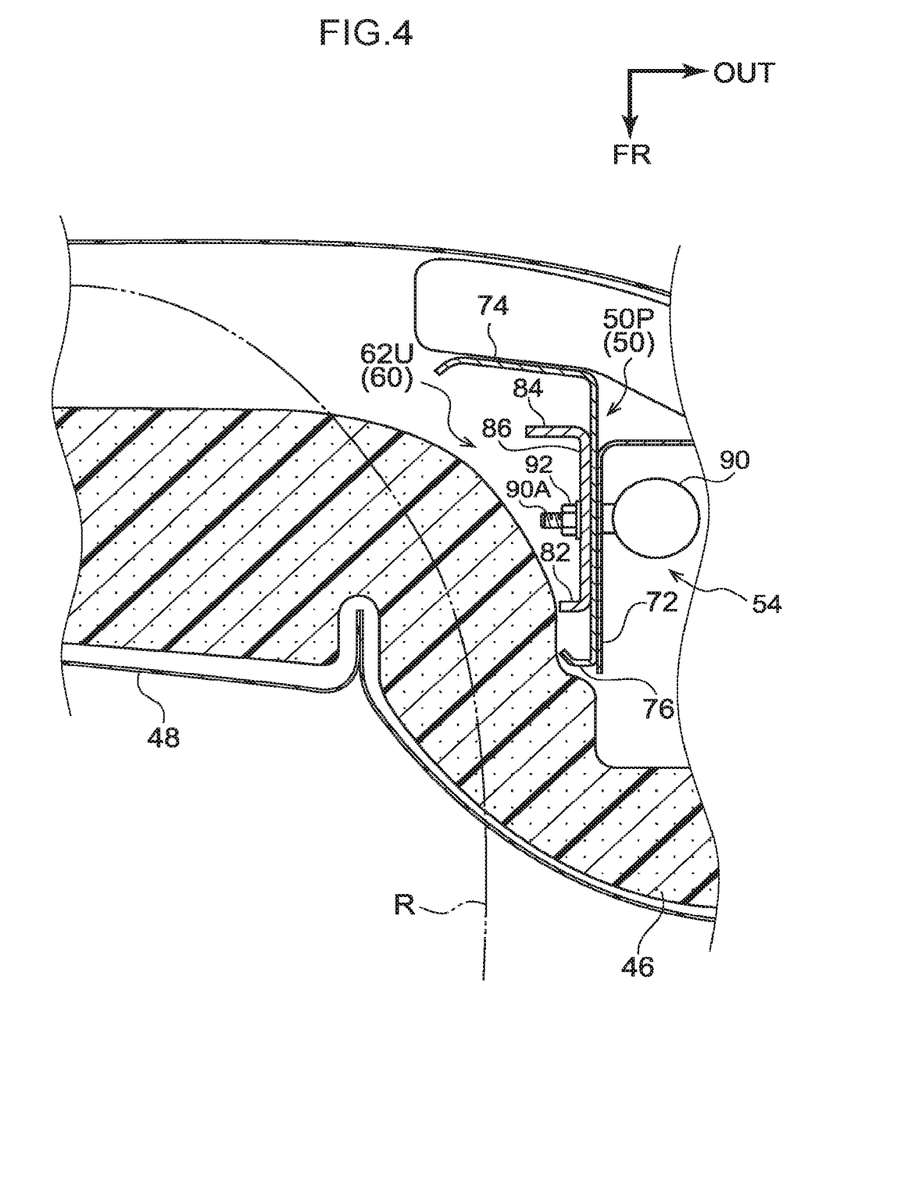
FIG. 4 is a cross-section illustrating an enlarged cross-section taken along line 4-4 in FIG. 2.

Next, with reference to FIG. 2 to FIG. 4, detailed explanation follows regarding the first transmission member 60 and the second transmission member 62 of the side collision load transmission structure 10 of the present exemplary embodiment, and structures peripheral thereto.

FIG. 2 illustrates an enlargement of structures peripheral to the second transmission member 62 in the seatback frame 34. As illustrated in FIG. 2, the side frames 50 are manufactured from sheet metal with their sheet thickness direction in the seatback width direction, and are formed in shapes that bend toward the seatback width direction center at front side end portions and rear side end portions. In other words, each side frame 50 includes a general portion 72 forming a face orthogonal to the vehicle width direction, a rear wall portion 714 extending from a rear end portion of the general portion 72 toward the seat width direction inside, and a front wall portion 76 extending from a front end portion of the general portion 72 toward the seat width direction inside.

The reclining rod 42 spans between the lower end portions 50L of the pair of left and right side frames 50 so as to penetrate the general portions 72 of the pair of left and right side frames 50. The first transmission member 60 is provided separately to the reclining rod 42, and the lower end portions 50L of the pair of left and right side frames 50 are coupled together by the first transmission member 60. The first transmission member 60 is an elongated member, and has a rectangular shaped closed cross-section profile in the present exemplary embodiment. For example, the first transmission member 60 is formed from panels with a hat shaped cross-section. Note that the shape of the first transmission member 60 is not limited thereto, and the cross-section profile may be a circular closed cross-section, or may be an open cross-section such as a substantially U-shaped cross-section profile (a shape substantially resembling three sides of a rectangle). The first transmission member 60 is disposed immediately above the reclining rod 42 in the seatback up-down direction, and at the rear of the reclining rod 42 in the seatback front-rear direction. A vehicle width direction outside (center pillar 16 side) end portion 60A of the first transmission member 60 is joined to the general portion 72 of the side frame 50P, and a vehicle width direction inside (console box 24 side) end portion 60B of the first transmission member 60 is joined to the general portion 72 of the side frame 50C. Due to this configuration, the first transmission member 60 is hidden by the general portions 72 of the side frames 50 as viewed from the side of the vehicle (as viewed from the side of the seatback).

The second transmission member 62 is joined to a portion of the first transmission member 60 that is further to the vehicle width direction outside than the length direction center of the first transmission member 60. The second transmission member 62 includes a front plate portion 82 extending in the seatback width direction and the up-down direction, a rear plate portion 84 extending in the seatback width direction and the up-down direction, and disposed at a separation to the seatback rear of the front plate portion 82, and a coupling plate portion 86 that couples together seatback width direction outside (side frame 50P side) end portions of the front plate portion 82 and the rear plate portion 84. Namely, as viewed in cross-section taken orthogonally to the seatback up-down direction, the second transmission member 62 has a substantially U-shaped cross-section (a shape substantially resembling three sides of a rectangle) opening toward the seatback width direction central side (see FIG. 3). The front plate portion 82 and the rear plate portion 84 both configure substantially right-angled triangle shapes as viewed from the front of the seatback. One side of the right-angled triangle is disposed so as to follow the general portion 72 of the side frame 50P. A lower end portion 62L of the second transmission member 62 is joined to the first transmission member 60, and an upper portion 62U of the second transmission member 62 is joined to the side frame 50P.

FIG. 4 is a cross-section taken along a plane orthogonal to the seatback up-down direction at a height corresponding to the upper portion 62U of the second transmission member 62. As illustrated in FIG. 4, at the height corresponding to the upper portion 62U of the second transmission member 62, the airbag module 54 is disposed at the seatback width direction outside of the second transmission member 62, with the side frame SOP interposed therebetween. The airbag module 54 includes an inflator 90. The inflator 90 is what is referred to as a cylinder-type gas generation device, and is a rigid body formed in a circular cylinder shape. The inflator 90 is housed within a side airbag, not illustrated in the drawings, and is disposed in an orientation with its axis running in the seatback up-down direction. A bolt 90A projects out from an outer peripheral portion of the inflator 90. The bolt 90A penetrates a base cloth of the airbag, not illustrated in the drawings, the general portion 72 of the side frame 50P, and the coupling plate portion 86 of the second transmission member 62, and is screwed together with a nut 92 at a leading end side.

As illustrated in FIG. 3 and FIG. 4, the seatback width direction length of the rear plate portion 84 is formed longer than the seatback width direction length of the front plate portion 82. Accordingly, the rear plate portion 84 extends further toward the seatback width direction center side than the front plate portion 82.

The first transmission member 60 and the second transmission member 62 are provided so as to avoid the range R in which the upper body of the occupant sinks into seatback 38. Namely, in the neck load reduction structure of the vehicle seat 30, it is anticipated that the upper body of the occupant will sink into the seatback 38 in the range R indicated by the double-dotted intermittent lines in FIG. 1, and the first transmission member 60 and the second transmission member 62 are provided an as to avoid this range R. Moreover, it is anticipated that the upper body of the occupant will sink into the seatback 38 in the range R indicated by the double-dotted intermittent lines in FIG. 3 and FIG. 4, and the second transmission member 62 is provided so as to avoid this range R.

Although not illustrated in FIG. 1, the seatback frame 34 includes a seatback lower frame 51 coupling together lower ends of the pair of left and right side frames 50, as illustrated in FIG. 2.

Operation and Advantageous Effects

Next, explanation follows regarding operation and advantageous effects of the side collision load transmission structure 10 of the present exemplary embodiment.

Figure 5:
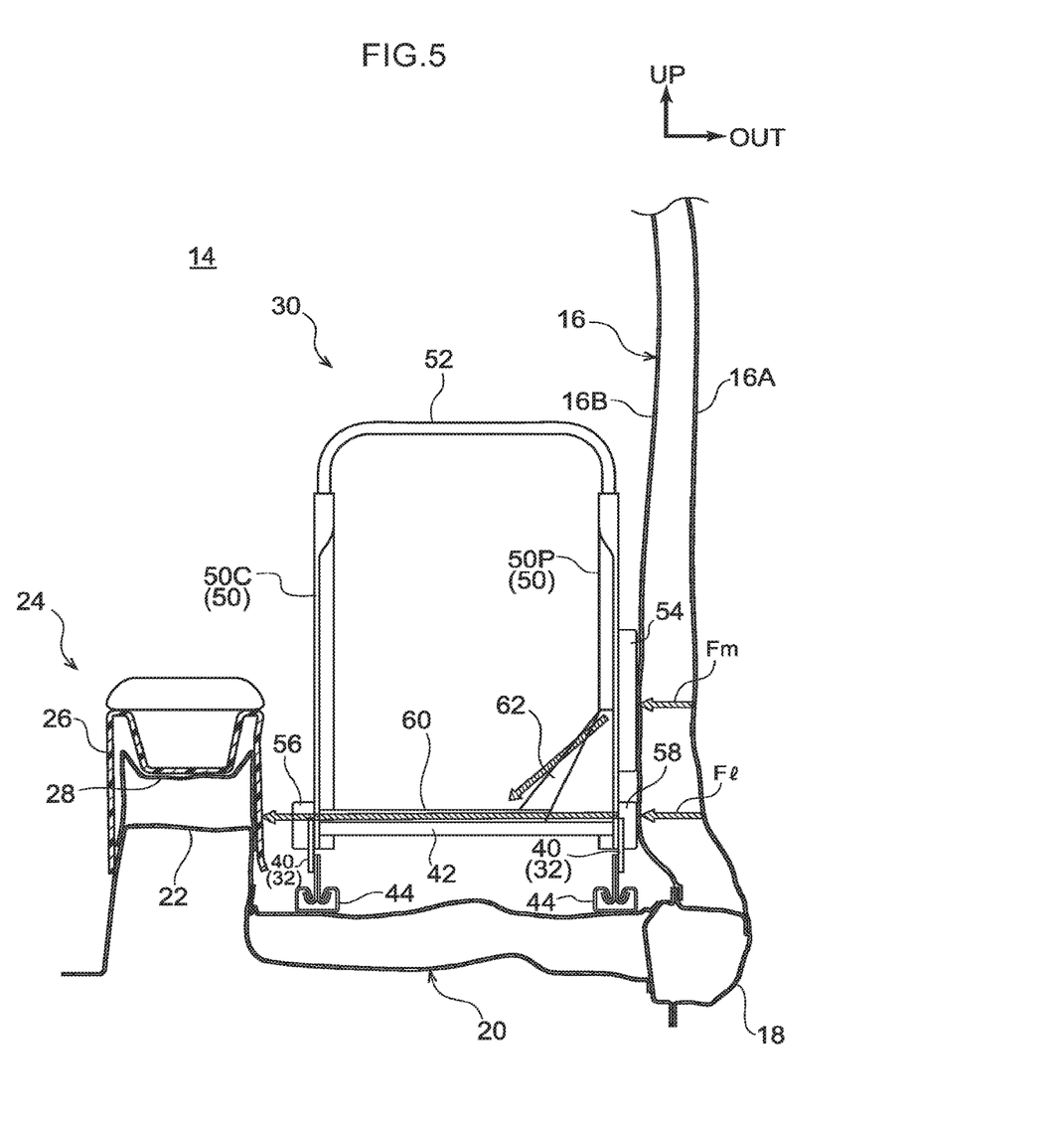
FIG. 5 is a cross-section corresponding to FIG. 1, illustrating a state in which a side-on collision has occurred.

The side collision load transmission structure 10 of the present exemplary embodiment includes the pair of left and right side frames 50 extending along the seatback up-down direction at the left and right side sections of the seatback 38. The lower end portions SOL of the pair of left and right side frames 50 are coupled together in the seatback width direction (namely, in the vehicle width direction) by the first transmission member 60. The console box 24, serving as a load receiving member, is provided at a vehicle width direction central portion of the vehicle compartment 14 so as to face the vehicle width direction inside end portion 60B of the first transmission member 60 in the vehicle width direction. Accordingly, as illustrated in FIG. 5, in a side collision, when vehicle width direction load is input to the seatback 38 from the vehicle compartment side wall, for example the center pillar 16 or the side door (not illustrated in the drawings), a load F1 input to a lower portion of the seatback 38 is transmitted through the first transmission member 60 to the console box 24.

The side collision load transmission structure 10 further includes the second transmission member 62. The second transmission member 62 couples together a portion of the side frame 50P, out of the pair of side frames 50, on the vehicle width direction outside (center pillar 16 side) that is further to the seatback up-down direction upper side than the portion joined to the first transmission member 60, and a portion of the first transmission member 60 that is further to the vehicle width direction outside than the length direction center of the first transmission member 60, so as to be coupled at an incline as viewed from the front of the vehicle. Accordingly, as illustrated in FIG. 5, in the event of a side collision, a load Fm input to an up-down direction intermediate portion of the seatback 38 is transmitted through the second transmission member 62 and the first transmission member 60 to the console box 24.

As described above, in the side collision load transmission structure 10, vehicle width direction load input to the seatback 38 is transmitted to the load receiving member along two routes, and the load is further transmitted through the floor tunnel 22 so as to be dispersed in the vehicle body floor (floor panel 20). This thereby enables deformation of the seatback 38 to be suppressed, and enables a reduction in an intrusion amount of the vehicle compartment side wall (the center pillar 16 or the side door, not illustrated in the drawings) over a region from the chest region to the waist region of the occupant.

Moreover, the first transmission member 60 and the second transmission member 62 are provided avoiding the range R where the upper body of the occupant sinks into the seatback 38 in a rear collision. Accordingly, the upper body of the occupant is not impeded from sinking into the seatback, and the neck load reduction performance of the vehicle seat 30 is not affected.

The first transmission member 60 and the second transmission member 62 are both hidden by the general portions 72 of the side frames 50 as viewed from the side of the vehicle. An increase in the thickness of the seatback 38 due to the first transmission member 60 and the second transmission member 62 is accordingly suppressed. Securing legroom for an occupant seated in a rear seat is made easier as a result.

In the side collision load transmission structure 10 of the present exemplary embodiment, the second transmission member 62 is configured including the front plate portion 82 extending along the width direction and the up-down direction of the seatback, the rear plate portion 84 disposed at a separation to the seatback rear from the front plate portion 82 and extending along the width direction and the up-down direction of the seatback, and the coupling plate portion 86 coupling the front plate portion 82 and the rear plate portion 84 together along the seatback front-rear direction. Such a cross-section profile enables the strength of the second transmission member 62 to be secured easily, thereby enabling deformation of the seatback 38 to be further suppressed, and enabling a reduction in the intrusion amount of the vehicle compartment side wall over the region from the chest region to the waist region of the occupant.

In the side collision load transmission structure 10 of the present exemplary embodiment, the coupling plate portion 86 couples together seatback width outside end portions of the front plate portion 82 and the rear plate portion 84. Namely, across-section of the second transmission member 62 taken orthogonally to the seatback up-down direction has a substantially U-shape (a shape substantially resembling three sides of a rectangle) opening toward the seatback width direction inside. The second transmission member 62 can accordingly be easily manufactured by pressing sheet metal or the like. Moreover, since the coupling plate portion 86 can be overlapped with the general portion 72 of the side frame SOP, the second transmission member 62 and the side frame SOP can be joined together easily, and the joint strength can be easily secured.

The side collision load transmission structure 10 of the present exemplary embodiment further includes the inflator 90. The inflator 90 is disposed on the vehicle width direction outside of the side frame SOP, out of the pair of side frames 50, on the vehicle width direction outside (the center pillar 16 side). The upper portion 62U of the second transmission member 62 is fixed to the side frame SOP by the fastening members that fix the inflator 90 to the side frame SOP (the bolt 90A and the nut 92). In a side collision, the load Fm is accordingly transmitted promptly to the upper portion 62U of the second transmission member 62 through the inflator 90. Moreover, the same fastening members can be commonly used as both the fastening members that fix the inflator 90 and the fastening members that fix the second transmission member 62.

Supplementary Explanation of the Present Exemplary Embodiment

Figure 6:
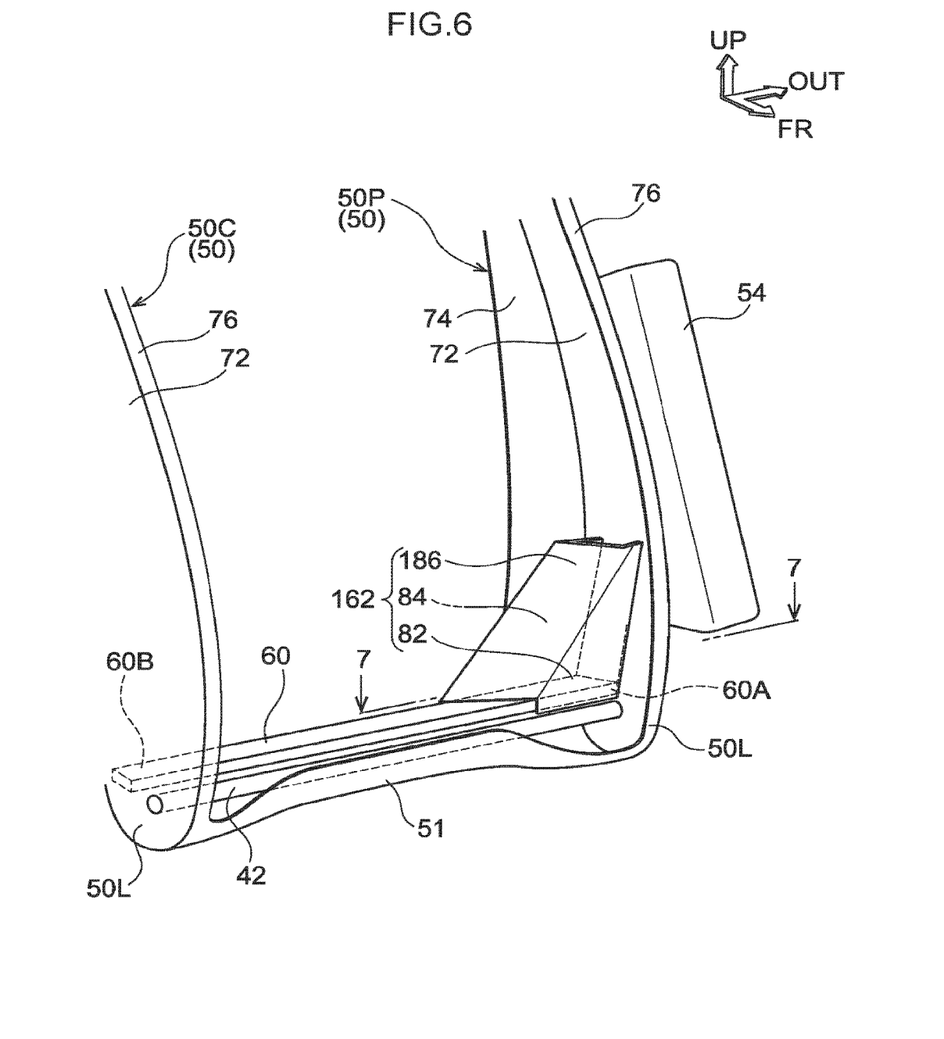
FIG. 6 is an enlarged perspective view corresponding to FIG. 2, illustrating a second transmission member according to another example.
Figure 7:
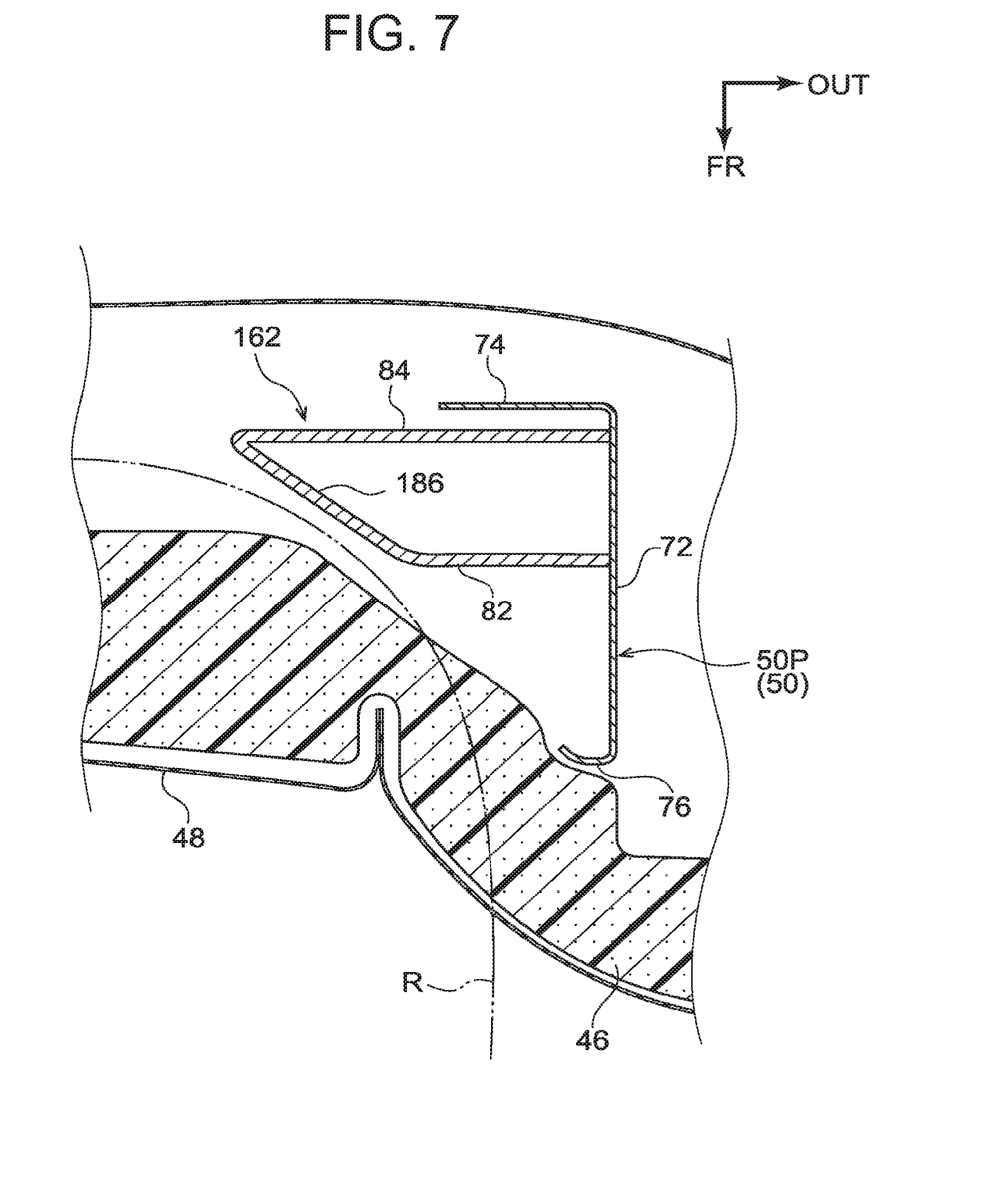
FIG. 7 is a cross-section illustrating an enlarged cross-section taken along line 7-7 in FIG. 6.

Note that in the exemplary embodiment described above, the coupling plate portion 86 of the second transmission member 62 couples together seatback width direction outside (side frame 50P side) end portions of the front plate portion 82 and the rear plate portion 84. However, the "coupling plate portion" of the present invention is not limited thereto. For example, as illustrated in FIG. 6 and FIG. 7, a coupling plate portion 186 may couple together seatback width direction inside end portions of the front plate portion 82 and the rear plate portion 84 (in a second transmission member 162). As viewed from the front of the vehicle, the coupling plate portion 186 is disposed at an incline between an up-down direction intermediate portion of the side frame 50 and a seatback width direction intermediate portion of the first transmission member 60. The coupling plate portion 186 accordingly makes a greater contribution to increasing load transmission in the vehicle width direction than the coupling plate portion 86 in the exemplary embodiment described above. Deformation of the seatback 38 (the seatback frame 34) is further suppressed as a result.

In the exemplary embodiment described above, the second transmission member 62 is configured including the front plate portion 82, the rear plate portion 84, and the coupling plate portion 86. However, the "second transmission member" of the present invention is not limited thereto. For example, a second transmission member may be configured without the front plate portion V the exemplary embodiment described above (with a substantially L-shaped cross-section profile orthogonal to the seatback up-down direction).

In the exemplary embodiment described above, the first transmission member 60 is provided separately to the reclining rod 42. However, the present invention is not limited thereto, and a reclining rod may be provided so as to serve as a "first transmission member". Such a configuration enables a further reduction in the number of components.

What is claimed is:
1. A side collision load transmission structure comprising:
a floor tunnel that is provided at a vehicle width direction central portion of a vehicle body floor, and that extends along a vehicle front-rear direction;
a vehicle compartment side wall that configures a side wall of a vehicle compartment;
a vehicle seat that is provided between the floor tunnel and the vehicle compartment side wall, and that includes a neck load reduction structure to allow the upper body of an occupant to sink into a seatback in a rear-end collision;

a pair of side frames that are disposed at a separation to each other in a seatback width direction and configure left and right frames of the seatback, and that are each configured including a general portion forming a face orthogonal to the seatback width direction;

a first transmission member that is disposed with its length direction along the seatback width direction and that couples together lower end portions of the pair of side frames along the vehicle width direction, that is provided so as to avoid a range where the upper body of the occupant sinks into the seatback in a rear-end collision, and that is hidden by the general portions of the pair of side frames as viewed from a side of the vehicle;

a load receiving member that is disposed at a vehicle upper side of the floor tunnel, and that is provided so as to face a vehicle width direction inside end portion of the first transmission member in the vehicle width direction;

a second transmission member that couples together a portion further to a seatback up-down direction upper side than a join portion with the first transmission member on the side frame, out of the pair of side frames, on the vehicle compartment side wall side and a portion of the first transmission member that is further to a vehicle width direction outside than the length direction center of the first transmission member so as to be coupled at an incline as viewed from the front of the vehicle, is provided so as to avoid the range where the upper body of the occupant sinks into the seatback in a rear-end collision, and is hidden by the general portions of the pair of side frames as viewed from the side of the vehicle; and a side airbag inflator that is fixed by a fastening member to the seatback width direction outside of the side frame, out of the pair of side frames, on the vehicle compartment side wall side, wherein an upper portion of the second transmission member is joined to the side frame by the fastening member.

2. The side collision load transmission structure of claim 1, wherein the second transmission member includes:

a front plate portion that extends along the width direction and the up-down direction of the seatback;

a rear plate portion that is disposed at a separation to a seatback front-rear direction rear side of the front plate portion, and that extends along the width direction and the up-down direction of the seatback; and a coupling plate portion that couples the front plate portion and the rear plate portion together in the seatback front-rear direction.

3. The side collision load transmission structure of claim 2, wherein the coupling plate portion couples together seatback width direction outside end portions of the front plate portion and the rear plate portion.

* * * * *